US008387376B2

(12) United States Patent
Son

(10) Patent No.: US 8,387,376 B2
(45) Date of Patent: Mar. 5, 2013

(54) HYDRAULIC SYSTEM WITH IMPROVED COMPLEX OPERATION

(75) Inventor: Young Jin Son, Changwon-si (KR)

(73) Assignee: Vovlvo Construction Equipment Holding Sweden AB, Eskilstuna (SE)

( * ) Notice: Subject to any disclaimer, the term of this patent is extended or adjusted under 35 U.S.C. 154(b) by 499 days.

(21) Appl. No.: 12/769,714

(22) Filed: Apr. 29, 2010

(65) Prior Publication Data

US 2010/0293936 A1 Nov. 25, 2010

(30) Foreign Application Priority Data

May 22, 2009 (KR) ........................ 10-2009-0044942

(51) Int. Cl.
*F16D 31/02* (2006.01)

(52) U.S. Cl. ................. 60/421; 60/394; 60/484; 60/486

(58) Field of Classification Search .................... 60/394, 60/421, 422, 429, 484, 486
See application file for complete search history.

(56) References Cited

U.S. PATENT DOCUMENTS 5,692,377 A * 12/1997 Moriya et al. .................. 60/421
7,841,175 B2 * 11/2010 Koo ................................ 60/421
8,146,355 B2 * 4/2012 Lee ................................ 60/421

* cited by examiner

*Primary Examiner* — Michael Leslie
(74) *Attorney, Agent, or Firm* — Ladas & Parry LLP

(57) ABSTRACT

A hydraulic system with an improved complex operation is provided, which can prevent the generation of shock in a boom by delaying pressure supply during start and end of pilot signal pressure supplied to a spool for controlling an option device when a boom ascending operation and an operation of an option device are simultaneously performed or when such a simultaneous operation of the boom and the option device switches over to an independent operation of the boom. The hydraulic system with an improved complex operation includes main hydraulic pumps and a pilot pump; a boom cylinder and an option device; a main control valve including a boom spool and an option device spool which are shifted by a pilot signal pressure from the pilot pump; an operation lever which controls the boom spool; an option operation pedal which controls the option device spool; a confluence spool for controlling the option device; and a controller which outputs an electric control signal to a proportional control valve for the option device so as to delay pilot signal pressure supplied to the confluence spool during start and end of the pilot signal pressure supply when a complex operation for simultaneously operating the boom cylinder and the option device is performed.

5 Claims, 6 Drawing Sheets

HYDRAULIC SYSTEM WITH IMPROVED COMPLEX OPERATION

CROSS-REFERENCE TO RELATED APPLICATION

This application is based on and claims priority from Korean Patent Application No. 10-2009-44942, filed on May 22, 2009 in the Korean Intellectual Property Office, the disclosure of which is incorporated herein in its entirety by reference.

BACKGROUND OF THE INVENTION

1. Field of the Invention

The present invention relates to a hydraulic system with an improved complex operation, which can prevent an abrupt operation of a boom of an excavator by delaying the responsibility of a control spool when the boom and an option device (e.g. a hammer, a shear, a rotator, or the like) are simultaneously operated in the excavator.

More particularly, the present invention relates to a hydraulic system with an improved complex operation, which can prevent the generation of shock in a boom by delaying pressure supply during start and end of pilot signal pressure supplied to a spool for controlling an option device when a boom ascending operation and an operation of an option device (e.g. a hammer, a shear, a rotator, or the like) are simultaneously performed or when such a simultaneous operation of the boom and the option device switches over to an independent operation of the boom.

2. Description of the Prior Art

As illustrated in FIG. 1, a hydraulic system with an improved complex operation of the related art includes variable displacement main hydraulic pumps 101 and 101*a* and a pilot pump 102 operated by an engine; a boom cylinder 118 and an option device (e.g. a hammer or the like) operated by the main hydraulic pumps 101 and 101*a*; a main control valve (MCV) 104 including a boom spool 106 and an option device spool 119 which are shifted by a pilot signal pressure from the pilot pump 102 to control hydraulic fluid supplied from the main hydraulic pumps 101 and 101*a* to the boom cylinder 118 and the option device, respectively; an operation (RCV) lever 109 controlling the boom spool 106 of the main control valve 104 by supplying the pilot signal pressure from the pilot pump 102 to the boom spool 106 through an output of an operation signal corresponding to an amount of operation by an operator; an option operation (RCV) pedal 110 controlling the option device spool 119 of the main control valve 104 by supplying the pilot signal pressure from the pilot pump 102 to the option device spool 119 through an output of an operation signal corresponding to the amount of operation by the operator; a confluence spool 107 for controlling the option device, which makes the hydraulic fluid from the main hydraulic pump 101*a* join the hydraulic fluid on the side of the main hydraulic pump 101 through a confluence flow path a to increase a boom ascending speed when the boom is operated to ascend and which intercepts confluence hydraulic fluid supplied to the boom cylinder 118 and supplies the hydraulic fluid to the option device when a complex work for simultaneously operating the operation lever 109 and the option operation pedal 110 is performed; and a controller 103 outputting an electric control signal to a proportional control valve 105 for the option device through a signal cable 115 so that the confluence spool 107 for controlling the option device is shifted by pilot signal pressure (i.e. second signal pressure) that passes through the proportional control valve 105 for the option device to intercept the confluence hydraulic fluid supplied to the boom cylinder 118 through the confluence flow path a and to supply the hydraulic fluid to the option device, when a complex operation for simultaneously operating the boom cylinder 118 and the option device is performed.

In the drawing, the unexplained reference numerals 122 and 123 denote regulators that variably control the discharged flow rate of the main hydraulic pumps 101 and 101*a* by controlling the inclination angles of the swash plates of the main hydraulic pumps 101 and 101*a* in proportion to the control signal (i.e. the second signal pressure) input from the controller 103 to electronic proportional valves 120 and 121.

The above-described confluence spool 107 for controlling the option device has a confluence function. That is, since a boom confluence function is required only to make the boom ascend, the confluence spool 107 for the option device has the boom confluence function in one direction and has an option device operation function or a flow control function for the option device (corresponding to an option flow control spool) in the other direction.

Accordingly, if an operator operates the operation lever 109 to make the boom ascend, the pilot signal pressure discharged from the pilot pump 102 is supplied to the boom spool 106 through the operation lever 109 and a flow path 111*a* in order to shift the boom spool. Accordingly, the hydraulic fluid discharged from the main hydraulic pump 101 is supplied to the boom cylinder 118 via the boom spool 106.

At the same time, as the confluence spool 107 is shifted by the pilot signal pressure supplied from the pilot pump 102 through the flow path 111*b*, the hydraulic fluid discharged from the main hydraulic pump 101*a* joins the hydraulic fluid on the side of the main hydraulic pump 101 through the confluence spool 107 and the confluence flow path a in order, and the confluence hydraulic fluid is supplied to the boom cylinder 118.

Accordingly, the boom ascending speed can be increased by the hydraulic fluid simultaneously supplied from the main hydraulic pumps 101 and 101*a* to the boom cylinder 118.

As described above, if the option device (e.g. a hammer or the like) is operated by the option operation pedal 110 during the ascending of the boom, the controller 103 senses the pilot signal pressure for operating the option device that is supplied from the pilot pump 102 to the flow path 112, and outputs the electric control signal to the proportional control valve 105 for the option device.

Accordingly, the pilot signal pressure in a flow path 114, having passed through the proportional control valve 105, operates the flow control spool side for the option device of the confluence spool 107, and thus the hydraulic fluid from the main hydraulic pump 101*a* is supplied to the option device through the option device spool that is shifted by the pilot signal pressure (see the graph of the pilot signal pressure control diagram of FIG. 2) in the flow path 112.

In this case, the boom confluence hydraulic fluid, which is supplied to the boom cylinder 118 to make the boom ascend, is intercepted. That is, by supplying the hydraulic fluid from one of the main hydraulic pumps 101 and 101*a* to the boom cylinder 118 and the option device, respectively, the boom cylinder 118 and the option device can be simultaneously operated.

In the hydraulic system of the related art, if the option device is operated during the ascending of the boom or the option device is stopped during the ascending of the boom, the boom confluence function and the option device flow control function are simultaneously performed by one confluence spool 107. Accordingly, the pilot signal pressure is instantaneously applied in an opposite direction (indicated as t1 and t2 in the graph of FIG. 2) to operate the confluence spool 107 for controlling the option device, and thus the boom ascending speed is abruptly changed to generate shock.

That is, in the case where the boom is first operated to ascend and then the option device is operated, as shown as the pilot signal pressure control curve illustrated in FIG. 2, the boom confluence operation is instantaneously interrupted, and thus the boom ascending speed is abruptly lowered to cause the shock generation.

In contrast, even in the case where the option device is first stopped during the simultaneous operation of the boom and the option device, the boom confluence operation is instantaneously performed, and thus the boom ascending speed is abruptly increased to generate the shock, resulting in the clattering of the equipment.

SUMMARY OF THE INVENTION

Accordingly, the present invention has been made to solve the above-mentioned problems occurring in the prior art while advantages achieved by the prior art are maintained intact.

Embodiments of the present invention relate to a hydraulic system with an improved complex operation, which can improve the stability and operability of equipment by preventing the generation of shock in a boom due to an abrupt change of a boom speed when a boom ascending operation and an operation of an option device are simultaneously performed or when such a simultaneous operation of the boom and the option device switches over to an independent operation of the boom.

In one embodiment of the present invention, there is provided a hydraulic system with an improved complex operation, which includes main hydraulic pumps and a pilot pump operated by an engine; a boom cylinder and an option device which are operated by the main hydraulic pumps; a main control valve including a boom spool and an option device spool which are shifted by a pilot signal pressure from the pilot pump to control hydraulic fluid supplied from the main hydraulic pumps to the boom cylinder and the option device, respectively; an operation lever which controls the boom spool by supplying the pilot signal pressure from the pilot pump to the boom spool through an output of an operation signal corresponding to an amount of operation by an operator; an option operation pedal which controls the option device spool by supplying the pilot signal pressure from the pilot pump to the option device spool through an output of an operation signal corresponding to the amount of operation by the operator; a confluence spool for controlling the option device, which performs the confluence of the hydraulic fluid from the main hydraulic pumps and supplies the confluence hydraulic fluid to the boom cylinder when the boom is operated to ascend by the operation of the operation lever, and which intercepts the confluence hydraulic fluid supplied to the boom cylinder and supplies the hydraulic fluid to the option device when a complex work for simultaneously operating the operation lever and the option operation pedal is performed; and a controller which outputs an electric control signal to a proportional control valve for the option device so as to delay pilot signal pressure supplied to the confluence spool for controlling the option device during start and end of the pilot signal pressure supply when a complex operation for simultaneously operating the boom cylinder and the option device is performed.

In another preferred embodiment of the present invention, the hydraulic system with an improved complex operation includes an orifice installed in a flow path for supplying the pilot signal pressure to the confluence spool for controlling the option device via the proportional control valve for the option device so as to delay the responsibility of the confluence spool for controlling the option device when the complex operation for simultaneously operating the boom cylinder and the option device is performed.

In still another preferred embodiment of the present invention, the hydraulic system with an improved complex operation includes a check valve installed in a flow path for supplying the pilot signal pressure to the confluence spool for controlling the option device via the proportional control valve for the option device, and an orifice installed in a branch flow path branched from and connected to an upper stream side and a downstream side of the check valve so as to delay the responsibility of the confluence spool for controlling the option device when the complex operation for simultaneously operating the boom cylinder and the option device is performed.

With the above-described construction, the hydraulic system with an improved complex operation according to embodiments of the present invention has the following advantages.

When the boom ascending operation and the operation of the option device are simultaneously performed, the generation of shock due to the abrupt change of the boom speed is prevented by delaying the responsibility of the option device control spool, and thus the equipment can be operated in an optimum state to prevent the clattering of the equipment.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
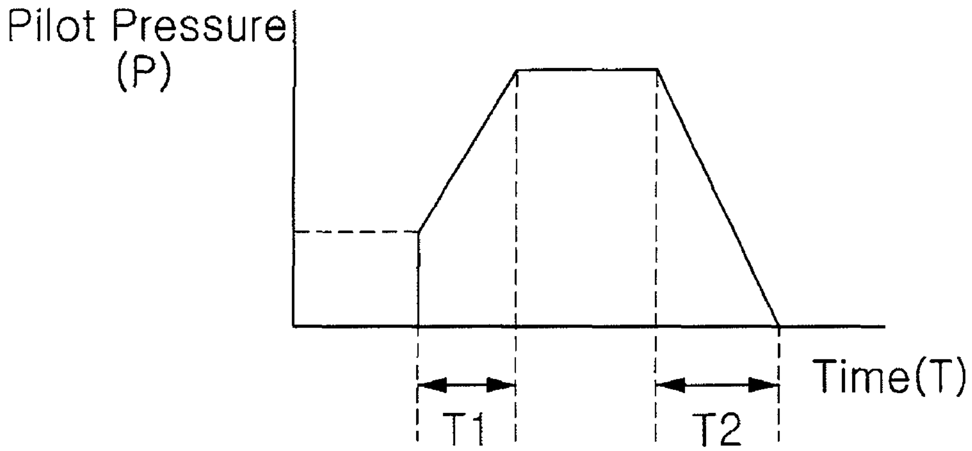
FIG. 3 is a graph illustrating a control diagram of pilot signal pressure according to a first embodiment of the present invention.
Figure 4:
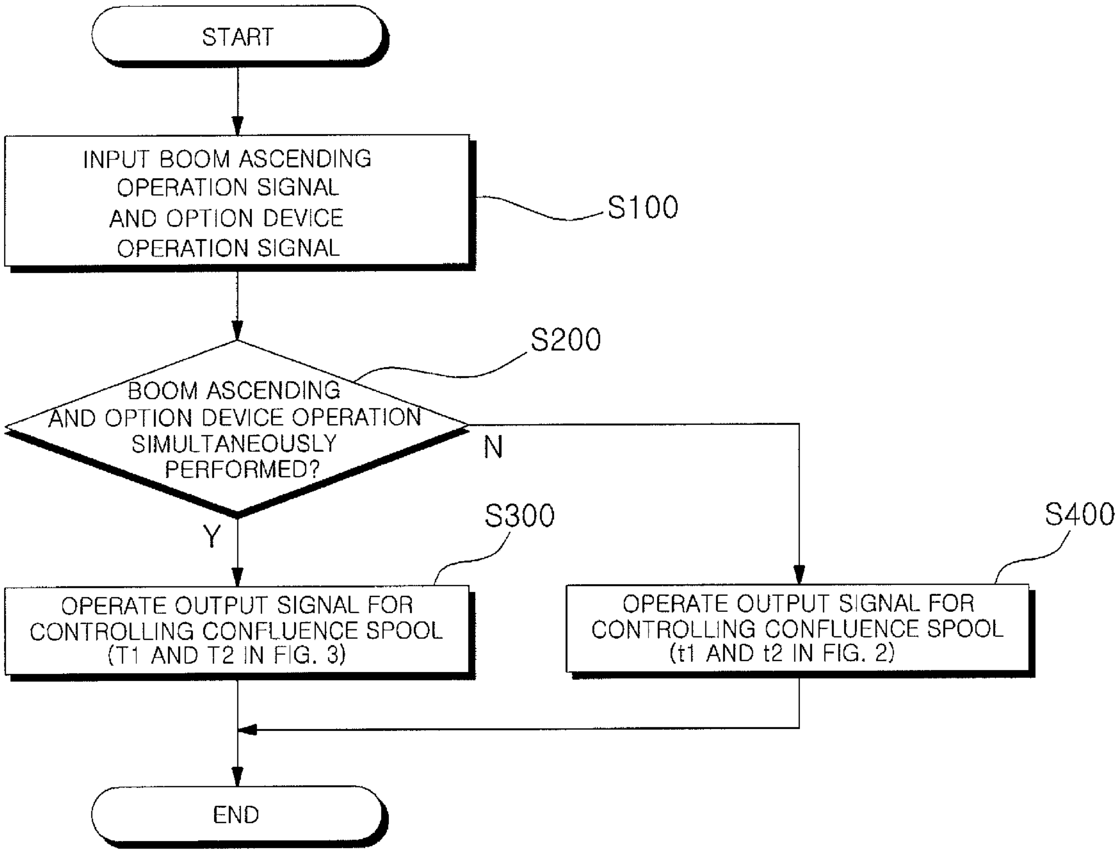
FIG. 4 is a flowchart explaining a hydraulic system with an improved complex operation according to the first embodiment of the present invention.
Figure 5:
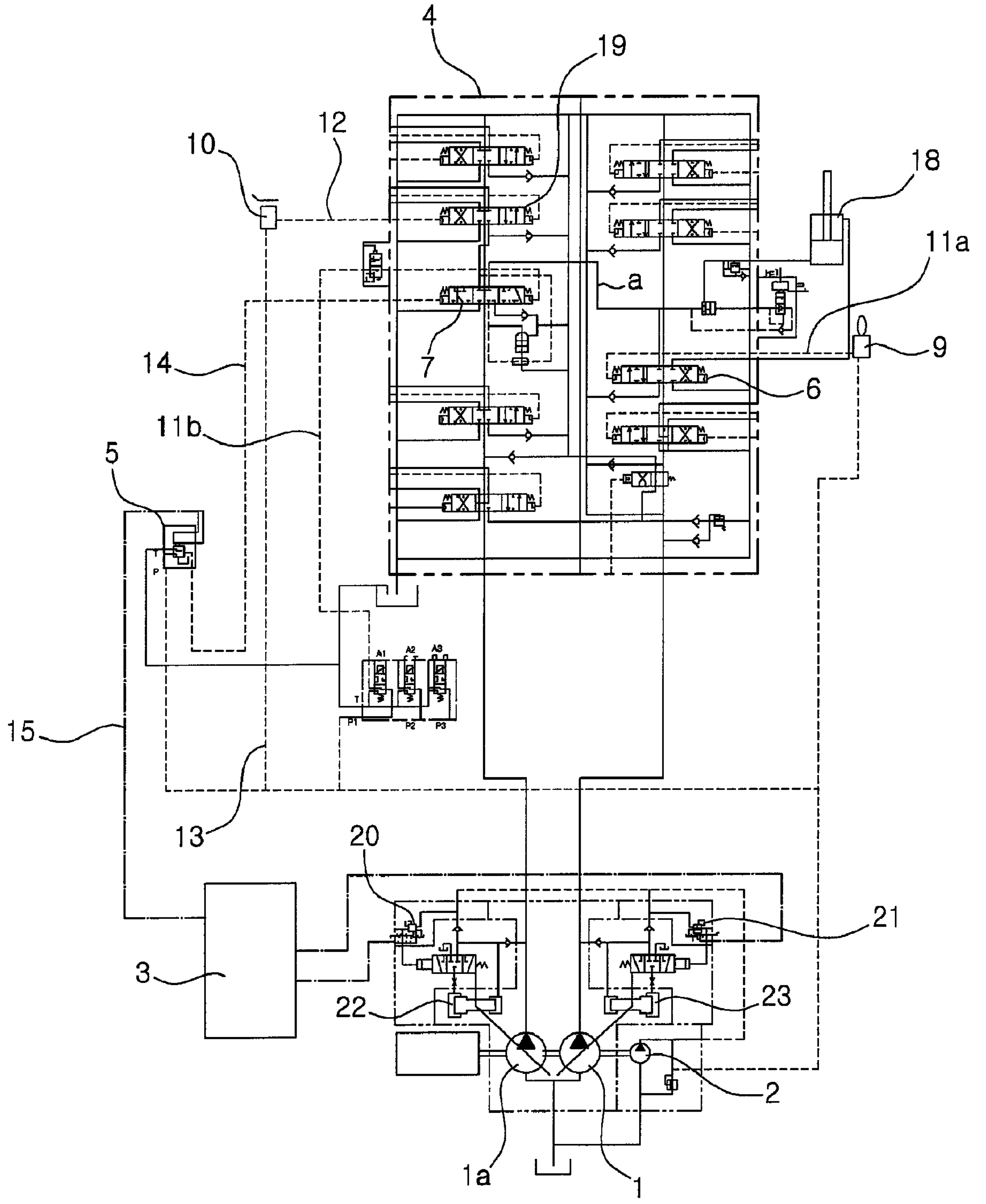
FIG. 5 is a circuit diagram illustrating a hydraulic system with an improved complex operation according to the first embodiment of the present invention.

FIGS. 3 to 5 show a hydraulic system with an improved complex operation according to a first embodiment of the present invention.

The hydraulic system with an improved complex operation according to the first embodiment of the present invention includes main hydraulic pumps 1 and 1*a* and a pilot pump 2 operated by an engine; a boom cylinder 18 and an option device (e.g. a hammer or the like) which are operated by the main hydraulic pumps 1 and 1*a*; a main control valve (MCV) 4 including a boom spool 18 and an option device spool which are shifted by a pilot signal pressure from the pilot pump 2 to control hydraulic fluid supplied from the main hydraulic pumps 1 and 1*a* to the boom cylinder 18 and the option device, respectively; an operation (RCV) lever 9 which controls the boom spool by supplying the pilot signal pressure from the pilot pump 2 to the boom spool through an output of an operation signal corresponding to an amount of operation by an operator; an option operation (RCV) pedal 10 which controls the option device spool 19 by supplying the pilot signal pressure from the pilot pump 2 to the option device spool 19 through an output of an operation signal corresponding to the amount of operation by the operator; a confluence spool 7 for controlling the option device, which performs the confluence of the hydraulic fluid from the main hydraulic pumps 1 and 1*a* and supplies the confluence hydraulic fluid to the boom cylinder 18 when the boom is operated to ascend by the operation of the operation lever 9, and which intercepts the confluence hydraulic fluid supplied to the boom cylinder 18 and supplies the hydraulic fluid to the option device when a complex work for simultaneously operating the operation lever 9 and the option operation pedal 10 is performed; and a controller 3 which outputs an electric control signal to a proportional control valve 5 for the option device so as to delay the pilot signal pressure (indicated as T1 and T2 of the graph illustrating the pilot pressure diagram illustrated in FIG. 3) supplied to the confluence spool 7 for controlling the option device during start and end of the pilot signal pressure supply when a complex operation for simultaneously operating the boom cylinder 18 and the option device is performed.

On the other hand, in the case where only the option device is operated, the operation is performed without delaying a boom speed, and thus the operability as usual can be secured.

Figure 1:
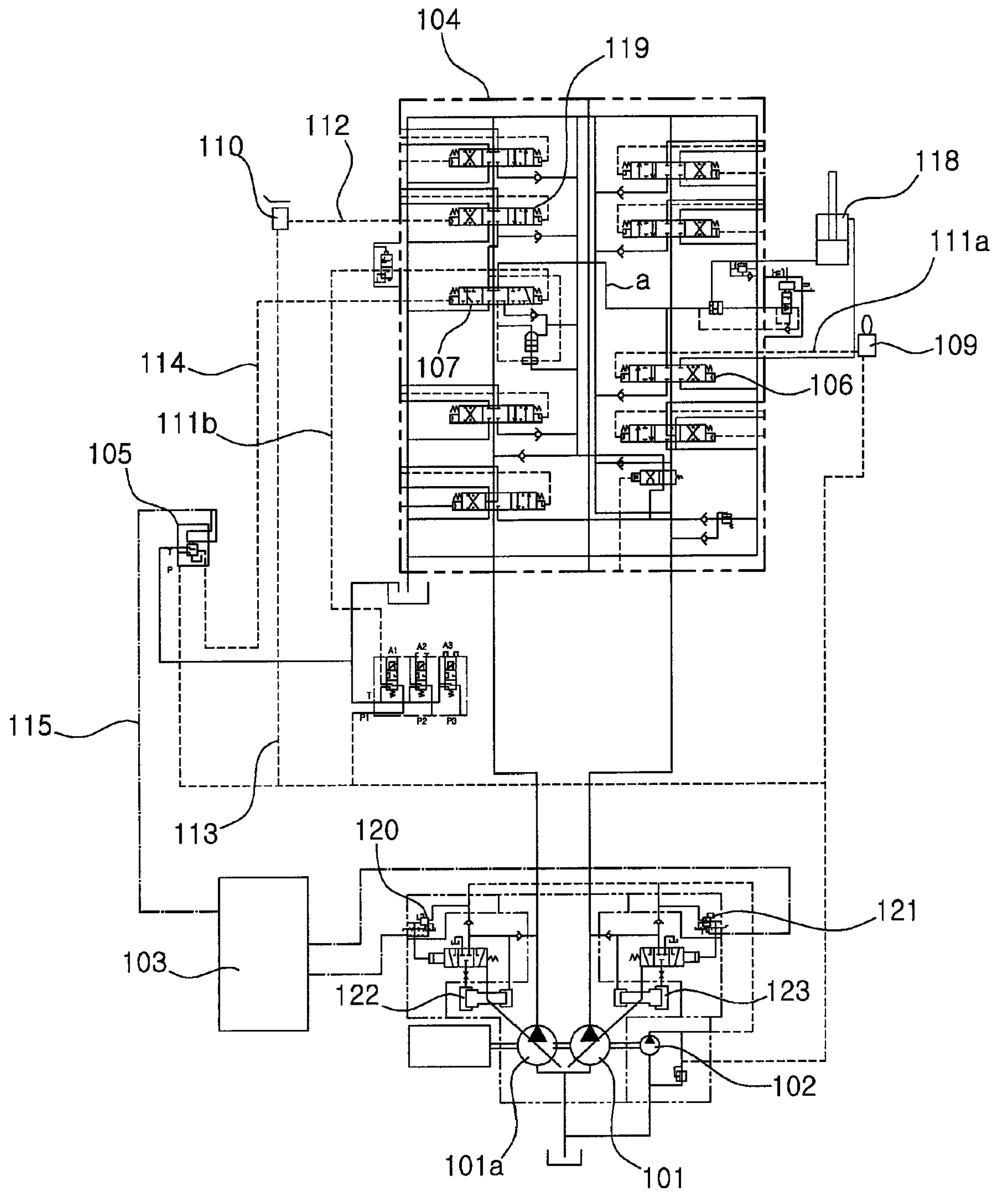
FIG. 1 PRIOR ART
FIG. 1 is a circuit diagram of a hydraulic system of the related art that can perform a complex operation.

In the case where a boom ascending operation and an operation of an option device are simultaneously performed, the responsibility of the confluence spool 7 for controlling the option device is delayed by delaying the pressure supply (indicated as T1 and T2 of the graph in FIG. 3) to the confluence spool 7 for controlling the option device during the start and end of the pilot signal pressure supplied to the confluence spool 7 for controlling the option device, and thus an abrupt operation of the boom is prevented. Other construction and operation except for the delay operation are substantially the same as those of the hydraulic system of the related art as illustrated in FIG. 1, and thus the detailed description thereof will be omitted.

Hereinafter, the hydraulic system with an improved complex operation according to the first embodiment of the present invention will be described in detail with reference to the accompanying drawings.

If an operator operates the operation lever 9 to make the boom ascend, the boom spool 6 is shifted by the pilot signal pressure which is supplied from the pilot pump 2 and passes through a flow path 11*a*, and thus the hydraulic fluid from the main hydraulic pump 1 is supplied to the boom cylinder 18 via the boom spool 6.

At the same time, the boom spool 6 is shifted by the pilot signal pressure which is supplied from the pilot pump 2 and passes through a flow path 11*a*, and thus the hydraulic fluid from the main hydraulic pump 1 joins the hydraulic fluid on the side of the main hydraulic pump 1 via the confluence spool 7 for controlling the option device and the confluence flow path a, and the confluence hydraulic fluid is supplied to the boom cylinder 18.

Accordingly, during the ascending operation of the boom, the boom ascending speed can be increased by the hydraulic fluid simultaneously supplied from the main hydraulic pumps 1 and 1*a* to the boom cylinder 18.

If the option operation pedal 10 is operated in order to operate the option device (e.g. a hammer or the like) (not illustrated), the option device spool 19 is shifted by the pilot signal pressure which is supplied from the pilot pump 2 and passes through the flow path 13, the option operation pedal 10, and the flow path 12 in order, and thus the option device is operated by the hydraulic fluid supplied from the main hydraulic pump 1*a*.

As in step S100, an operation signal for making the boom ascend by the operation lever 9 is input to the controller 3, and an operation signal for operating the option device by the option operation pedal 10 is input to the controller 3.

As in step S200, it is determined whether the operation for making the boom ascend by operating the operation lever 9 and the operation of the option device by operating the option operation pedal 10 are simultaneously performed. In the case of the simultaneous operation of the operation lever 9 and the option operation pedal 10, step S300 is performed, while in the case of the independent operation of the operation lever 9 or the option operation pedal 10, step S400 is performed.

In the case where the boom ascends by the operation lever 9 and the option device is also operated by the option operation pedal 10 as in step S300, the controller 3 outputs a control signal for shifting the confluence spool 7 for controlling the option device to the proportional control valve 5 for the option device through a signal cable 15. Accordingly, the pilot signal pressure discharged from the pilot pump 2 is supplied to the confluence spool 7 via the proportional control valve 5 and the flow path 14 in order.

That is, in the case where the pilot signal pressure is supplied to the confluence spool 7 for controlling the option device in order to simultaneously perform the boom ascending operation and the option device operation, the pilot signal pressure is delayed (indicated as T1 and T2 of the graph illustrating the pilot pressure diagram of FIG. 3) during the start and end of the pilot signal pressure supply to the confluence spool 7. Accordingly, the shifting speed of the confluence spool 7 is instantaneously controlled to prevent the abrupt operation of the boom.

Figure 2:
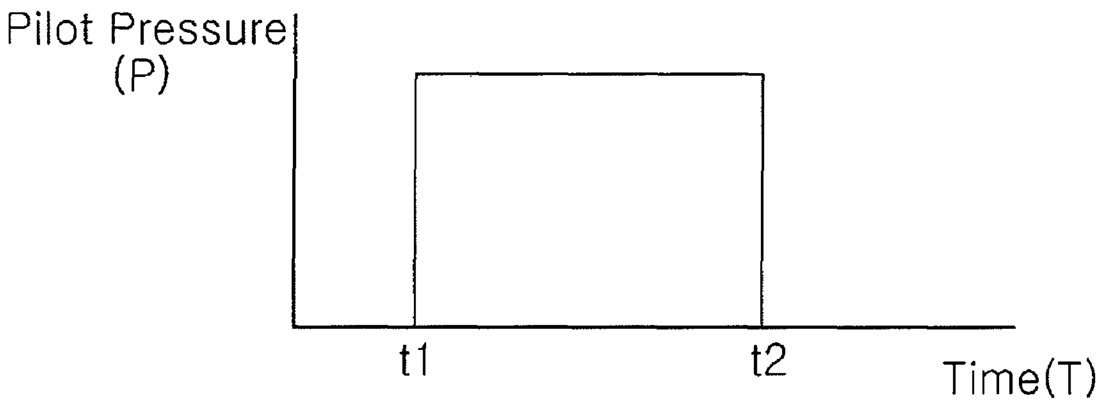
FIG. 2 PRIOR ART
FIG. 2 is a graph illustrating a control diagram of pilot signal pressure according to the related art.

As in step S400, in the case of operating only the option device by the option operation pedal 10, the option device is operated in a state where the speed of the confluence spool 7 is not controlled, and thus in the case where the operator operates the option operation pedal 10, the option device can be operated in proportion to the amount of operation of the option operation pedal 10 (as indicated as the graph illustrating the pilot pressure control diagram of FIG. 2).

Figure 6:
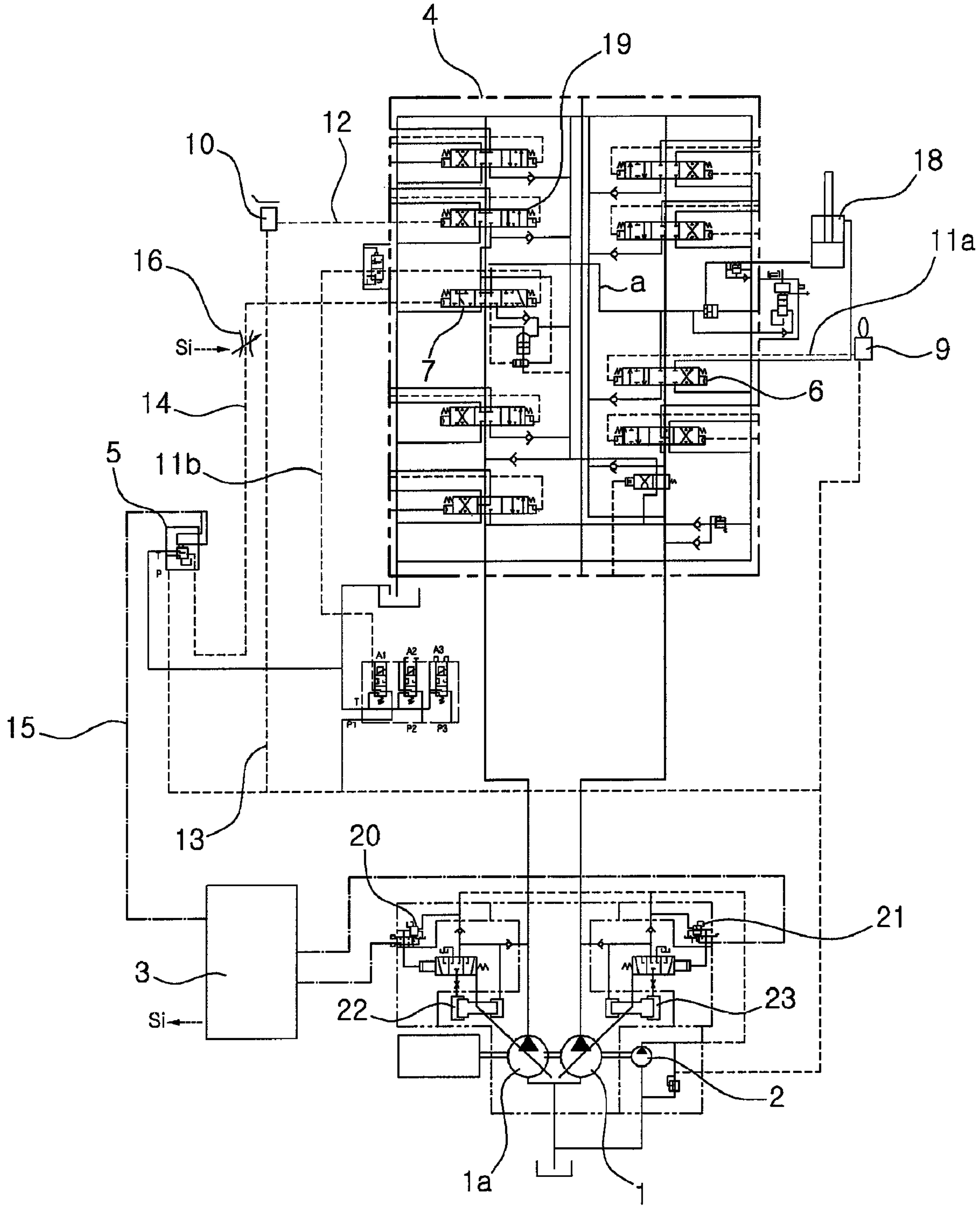
FIG. 6 is a circuit diagram illustrating a hydraulic system with an improved complex operation according to a second embodiment of the present invention.

The hydraulic system with an improved complex operation according to the second embodiment of the present invention, as shown in FIG. 6, includes an orifice 16 installed in the flow path 14 for supplying the pilot signal pressure to the confluence spool 7 for controlling the option device via the proportional control valve 5 for the option device.

During the complex operation for simultaneously operating the boom cylinder 18 and the option device, the orifice 16 receives the corresponding signal Si from the controller 3, and is shifted to an orifice setting state. During the independent operation for operating only one of the boom cylinder 18 and the option device, the orifice does not receive the signal from the controller 3, and is shifted to an orifice release state that is an initial state.

As a result, during the complex operation for simultaneously operating the boom cylinder 18 and the option device, the responsibility of the confluence spool 7 for controlling the option device is delayed.

Figure 7:
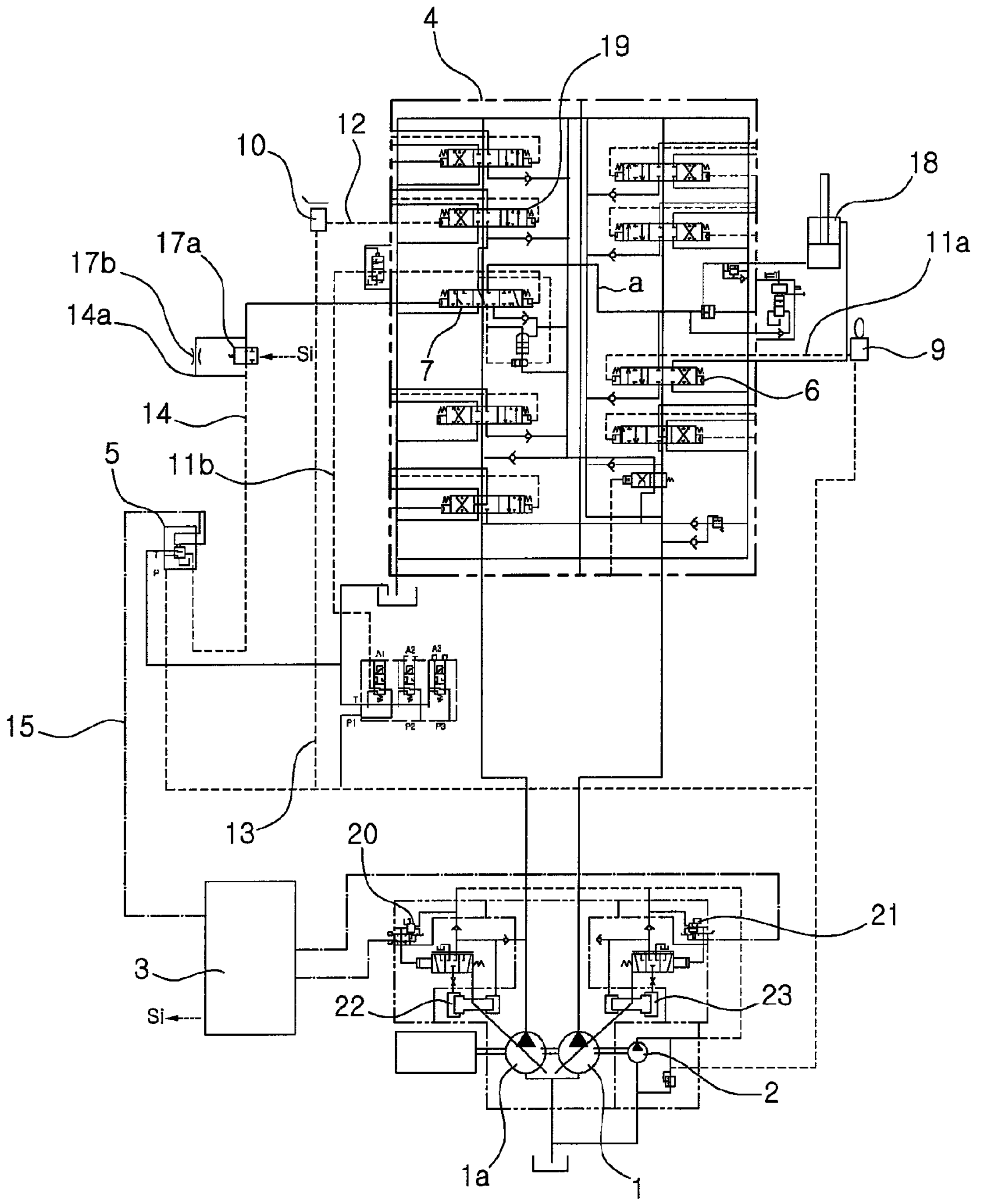
FIG. 7 is a circuit diagram illustrating a hydraulic system with an improved complex operation according to a third embodiment of the present invention.

Also, the hydraulic system with an improved complex operation according to the third embodiment of the present invention, as shown in FIG. 7, includes a valve 17*a* installed in the flow path for supplying the pilot signal pressure to the confluence spool 7 via the control valve 5 for the option device, and an orifice 17*b* installed in a branch flow path 14*a* branched from and connected to an upper stream side and a downstream side of the valve 17*a*.

During the complex operation for simultaneously operating the boom cylinder 18 and the option device, the valve 17*a* receives the corresponding signal Si from the controller 3, and is set to intercept the flow path of both ends of the valve 17*a* so that the signal pressure flows through the orifice 17*b*. During the independent operation for operating only one of the boom cylinder 18 and the option device, the valve does not receive the signal, and is shifted to a state where the flow path of both ends of the valve 17*a* is open, which is the initial state, so that the signal pressure flows through the valve 17*a* rather than the orifice 17*b*.

As a result, during the complex operation for simultaneously operating the boom cylinder 18 and the option device, the responsibility of the confluence spool 7 for controlling the option device is delayed.

With the above-described construction, during the complex operation for simultaneously operating the boom cylinder 18 and the option device, the pilot signal pressure that is supplied to the confluence spool 7 for controlling the option device via the proportional control valve 5 for the option device and the orifice 17*b* is delayed by the valve 17*a* installed in the flow path 14 and the orifice 17*b* in the branch flow path 14*a* branched from and connected to the upper stream side and the downstream side of the valve 17*a*, and thus the shifting speed of the confluence spool 7 is delayed to prevent the abrupt operation of the boom cylinder 18.

As described above, according to the hydraulic system according to the various embodiments of the present invention, when the boom ascending operation and the operation of the option device are simultaneously performed, the generation of shock due to the abrupt change of the boom speed is prevented by delaying the responsibility of the option device control spool, and thus the equipment can be operated in an optimum state to prevent the clattering of the equipment.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hydraulic system with an improved complex operation comprising:

main hydraulic pumps and a pilot pump operated by an engine;

a boom cylinder and an option device which are operated by the main hydraulic pumps;

a main control valve including a boom spool and an option device spool which are shifted by a pilot signal pressure from the pilot pump to control hydraulic fluid supplied from the main hydraulic pumps to the boom cylinder and the option device, respectively;

an operation lever which controls the boom spool by supplying the pilot signal pressure from the pilot pump to the boom spool through an output of an operation signal corresponding to an amount of operation by an operator;

an option operation pedal which controls the option device spool by supplying the pilot signal pressure from the pilot pump to the option device spool through an output of an operation signal corresponding to the amount of operation by the operator;

a confluence spool for controlling the option device, which performs the confluence of the hydraulic fluid from the main hydraulic pumps and supplies the confluence hydraulic fluid to the boom cylinder when the boom is operated to ascend by the operation of the operation lever, and which intercepts the confluence hydraulic fluid supplied to the boom cylinder and supplies the hydraulic fluid to the option device when a complex work for simultaneously operating the boom cylinder and the option device is performed; and a controller which outputs an electric control signal to a proportional control valve for the option device so as to delay pilot signal pressure supplied to the confluence spool for controlling the option device during start and end of the pilot signal pressure supply when a complex operation for simultaneously operating the boom cylinder and the option device is performed.

2. A hydraulic system with an improved complex operation comprising:

main hydraulic pumps and a pilot pump operated by an engine;

a boom cylinder and an option device which are operated by the main hydraulic pumps;

a main control valve including a boom spool and an option device spool which are shifted by a pilot signal pressure from the pilot pump to control hydraulic fluid supplied from the main hydraulic pumps to the boom cylinder and the option device, respectively;

an operation lever which controls the boom spool by supplying the pilot signal pressure from the pilot pump to the boom spool through an output of an operation signal corresponding to an amount of operation by an operator;

an option operation pedal which controls the option device spool by supplying the pilot signal pressure from the pilot pump to the option device spool through an output of an operation signal corresponding to the amount of operation by the operator;

a confluence spool for controlling the option device, which performs the confluence of the hydraulic fluid from the main hydraulic pumps and supplies the confluence hydraulic fluid to the boom cylinder when the boom is operated to ascend by the operation of the operation lever, and which intercepts the confluence hydraulic fluid supplied to the boom cylinder and supplies the hydraulic fluid to the option device when a complex work for simultaneously operating the boom cylinder and the option device is performed; and an orifice installed in a flow path for supplying the pilot signal pressure to the confluence spool for controlling the option device via a proportional control valve for the option device;

wherein the response of the confluence spool for controlling the option device is delayed when the complex operation for simultaneously operating the boom cylinder and the option device is performed.

3. The hydraulic system of claim 2, wherein during the complex operation for simultaneously operating the boom cylinder and the option device, the orifice is shifted to an orifice setting state, while during the independent operation for operating only one of the boom cylinder and the option device, the orifice is shifted to an orifice release state that is an initial state.

4. A hydraulic system with an improved complex operation comprising:

main hydraulic pumps and a pilot pump operated by an engine;

a boom cylinder and an option device which are operated by the main hydraulic pumps;

a main control valve including a boom spool and an option device spool which are shifted by a pilot signal pressure from the pilot pump to control hydraulic fluid supplied from the main hydraulic pumps to the boom cylinder and the option device, respectively;

an operation lever which controls the boom spool by supplying the pilot signal pressure from the pilot pump to the boom spool through an output of an operation signal corresponding to an amount of operation by an operator;

an option operation pedal which controls the option device spool by supplying the pilot signal pressure from the pilot pump to the option device spool through an output of an operation signal corresponding to the amount of operation by the operator;

a confluence spool for controlling the option device, which performs the confluence of the hydraulic fluid from the main hydraulic pumps and supplies the confluence hydraulic fluid to the boom cylinder when the boom is operated to ascend by the operation of the operation lever, and which intercepts the confluence hydraulic fluid supplied to the boom cylinder and supplies the hydraulic fluid to the option device when a complex work for simultaneously operating the boom cylinder and the option device is performed;

a check valve installed in a flow path for supplying the pilot signal pressure to the confluence spool for controlling the option device via a proportional control valve for the option device; and an orifice installed in a branch flow path branched from and connected to an upper stream side and a downstream side of the check valve;

wherein the response of the confluence spool for controlling the option device is delayed when the complex operation for simultaneously operating the boom cylinder and the option device is performed.

5. The hydraulic system of claim 4, wherein during the complex operation for simultaneously operating the boom cylinder and the option device, the valve is set to intercept the flow path of both ends of the valve so that the signal pressure flows through the orifice, while during the independent operation for operating only one of the boom cylinder and the option device, the valve is set to be shifted to a state where the flow path of both ends of the valve is open, which is an initial state, so that the signal pressure flows through the valve rather than the orifice.

* * * * *

UNITED STATES PATENT AND TRADEMARK OFFICE

CERTIFICATE OF CORRECTION

PATENT NO. : 8,387,376 B2
APPLICATION NO. : 12/769714
DATED : March 5, 2013
INVENTOR(S) : Young Jin Son It is certified that error appears in the above-identified patent and that said Letters Patent is hereby corrected as shown below:

Title Page, Item (73), Assignee: “Vovlvo” should read --Volvo--.

Signed and Sealed this
Twenty-third Day of April, 2013

Teresa Stanek Rea
*Acting Director of the United States Patent and Trademark Office*